United States Patent [19]

Cheng et al.

[11] Patent Number: 5,081,884
[45] Date of Patent: Jan. 21, 1992

[54] CRANKSHAFT APPARATUS

[76] Inventors: Cheng-Ming Cheng; Chien-Chang Cheng, both of No. 64-2, Mar Yuan Li, Chupei, Hsinchu, Taiwan

[21] Appl. No.: 608,487

[22] Filed: Nov. 1, 1990

[51] Int. Cl.$^5$ .......................... F16C 3/04; G05G 1/00
[52] U.S. Cl. .......................... 74/595; 74/572
[58] Field of Search .................. 74/572-574, 74/595-600

[56] References Cited

U.S. PATENT DOCUMENTS

| | | | |
|---|---|---|---|
| 2,926,546 | 3/1960 | Paulsen | 74/595 |
| 4,305,311 | 12/1981 | McGill | 74/595 |
| 4,332,148 | 6/1982 | Maki et al. | 74/595 |
| 4,813,296 | 3/1989 | Guinn | 74/595 |
| 4,884,666 | 12/1989 | Stahl | 74/574 X |
| 4,892,010 | 1/1990 | Pottier et al. | 74/595 |

FOREIGN PATENT DOCUMENTS

| | | | |
|---|---|---|---|
| 914207 | 6/1954 | Fed. Rep. of Germany | 74/595 |
| 0140013 | 10/1979 | Japan | 74/595 |
| 0587759 | 11/1979 | U.S.S.R. | 74/595 |

*Primary Examiner*—Vinh T. Luong
*Attorney, Agent, or Firm*—Wenderoth, Lind & Ponack

[57] ABSTRACT

A crankshaft apparatus is disclosed which includes a crankshaft having a crank pin, an inner portion, a middle portion, and an end portion, a bearing mounted about the crankshaft inner portion, a sleeve mounted about the crankshaft middle portion, a flywheel mounted about the sleeve, and a clutch mounted about the crankshaft end portion. The clutch has a driven side fixed to the flywheel, and a driving side. The driving side is operably connected to the crankshaft end portion by a key mechanism, which includes alignable slots formed in the crankshaft and the clutch, and keys mountable in the slots.

8 Claims, 3 Drawing Sheets

CRANKSHAFT APPARATUS

BACKGROUND OF THE INVENTION

1. Field of the Invention

The present invention relates to an improved crankshaft apparatus, and more particularly to a crankshaft and bearing assembly.

2. Description of the Prior Art

In the prior art, most heavy machines, such as crank presses, crank shapers, and crankshaft lathes, have transmissions for transferring work. The transmissions include a crankshaft and a crank pin, both of which are connected by two crank arms. The crankshaft is connected with a flywheel directly. Since the transmission is under heavy pressure during working, the crankshaft of the transmission is often damaged, when it is directly driven by the flywheel, because of sudden impacts or eccentric loads. Thus, the useful life of known crankshafts is always short and the crankshafts must be replaced frequently. This is a big problem with known crank machines.

It is the purpose of this present invention, therefore, to mitigate and/or obviate the abovementioned drawbacks in the manner set forth in the below detailed description of the preferred embodiment.

SUMMARY OF THE INVENTION

A primary objective of this invention is to provide an improved crankshaft apparatus of crank machines, which connects with a clutch and a sleeve for preventing the crankshaft from being driven directly by a flywheel.

Another objective of the present invention is to provide an improved assembly for a crankshaft and bearing, which is capable of avoiding the damage caused by sudden impacts or eccentric loads.

Further objectives and advantages of the present invention will become apparent as the following description proceeds.

DETAILED DESCRIPTION OF THE PREFERRED EMBODIMENT

Figure 1:
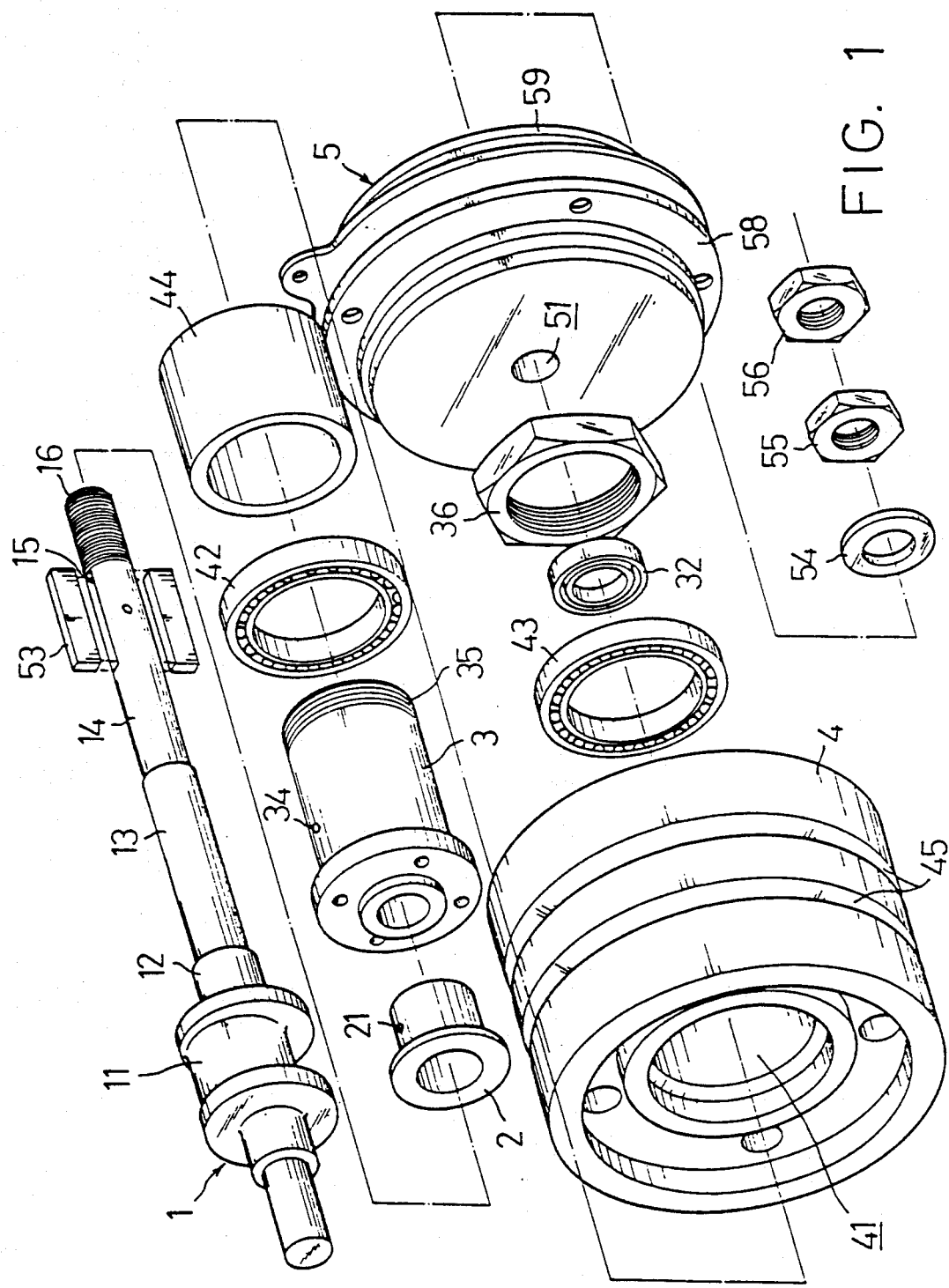
FIG. 1 is an exploded perspective view of a crank chain transmission in accordance with the present invention.
Figure 2:
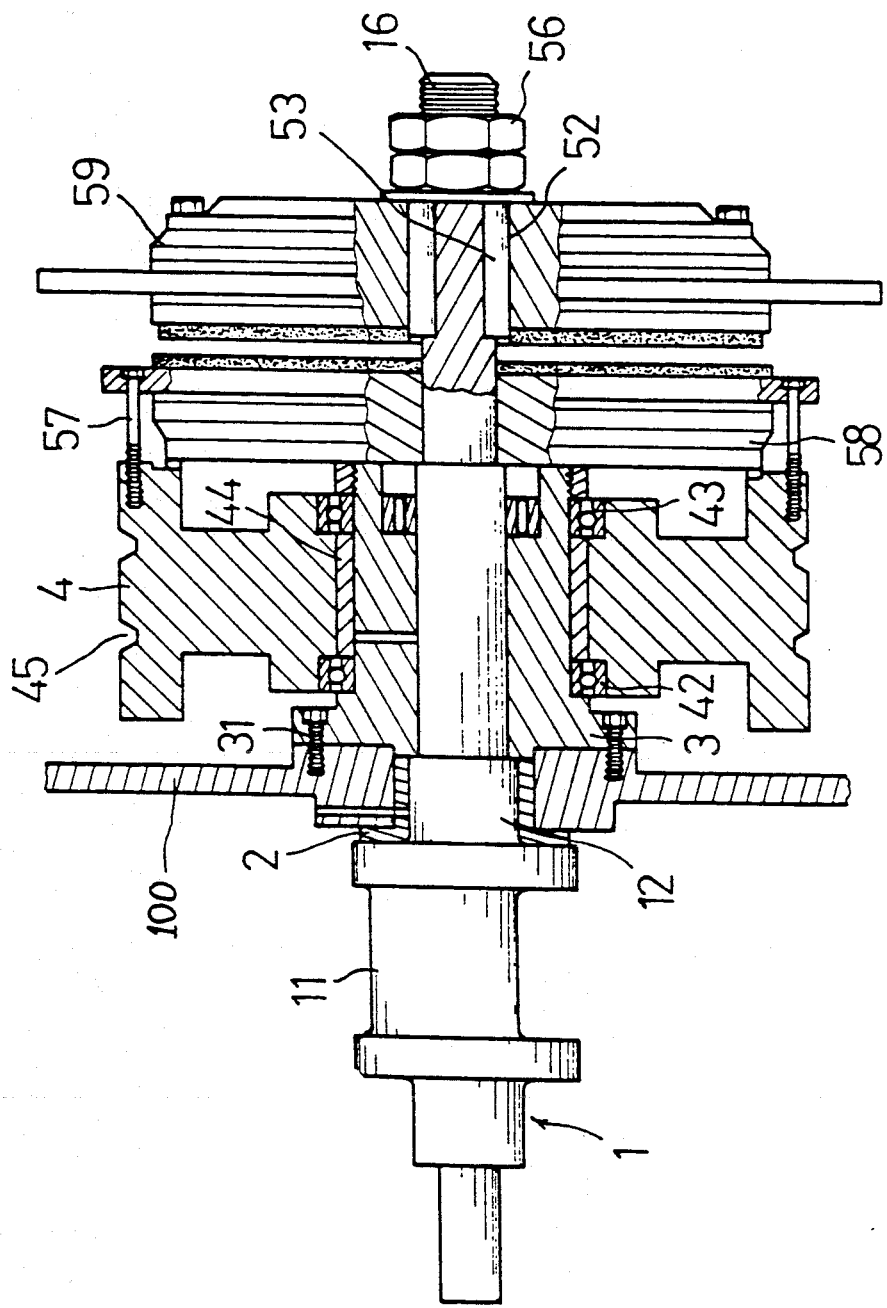
FIG. 2 is a cross-sectional view of a preferred embodiment in accordance with the present invention.

Referring to FIGS. 1 and 2, it can be seen that the present invention includes a crankshaft 1, a sleeve 3, a flywheel 4, and a clutch 5. The crankshaft 1 comprises a crank pin 11, an inner portion 12, a middle portion 13, and an end portion 14 having two slots 15 and a threaded end 16. A bearing 2, which is provided around the inner portion 12 of the crankshaft 1, has a hole 21 for injecting lubricating oil.

Figure 3:
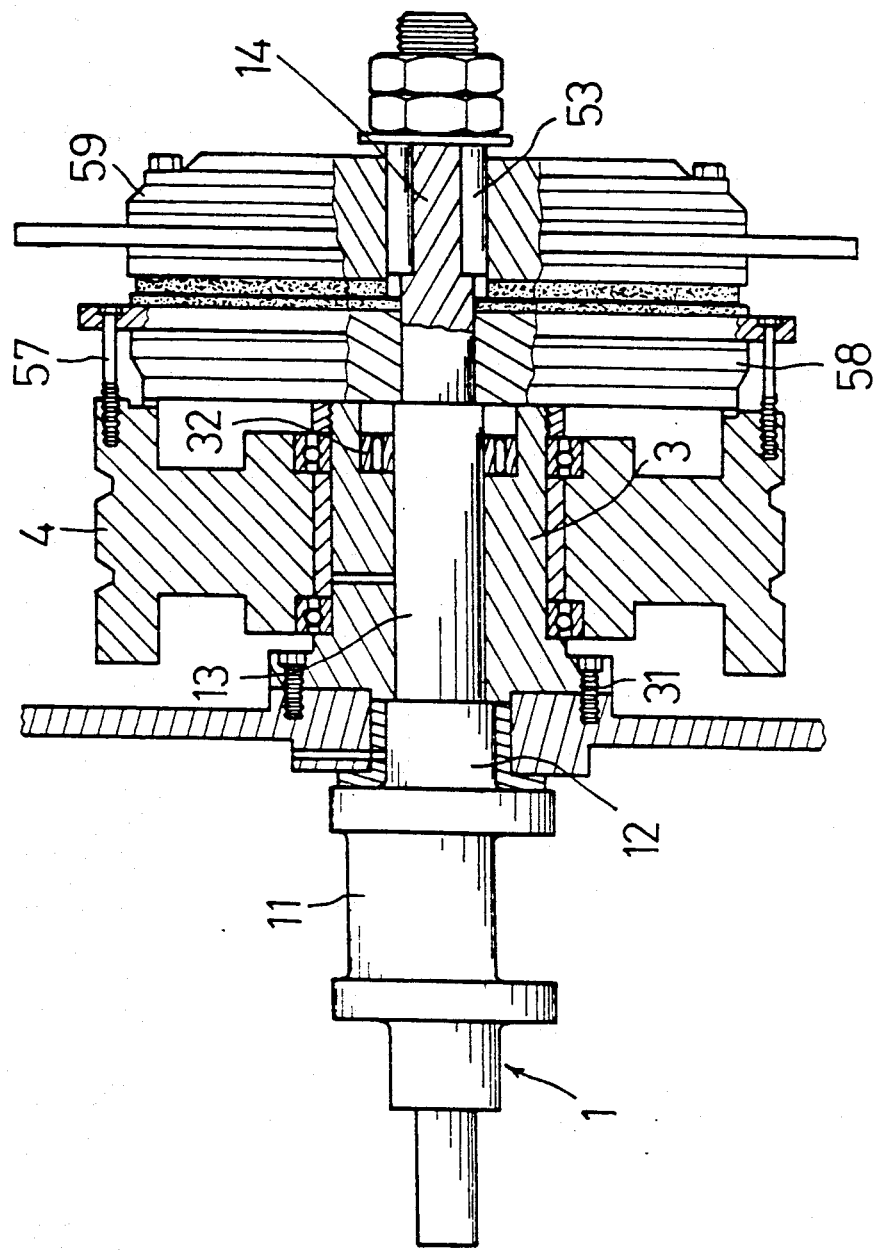
FIG. 3 is another cross-sectional view showing working state in accordance with the present invention.

The sleeve 3 is provided around the middle portion 13 of the crankshaft 1 and is adapted to be fixed to a crank machine frame 100 by bolts 31. The inside diameter of the sleeve 3 is slightly bigger than the outer diameter of the middle portion 13 and is slightly smaller than the outer diameter of the inner portion 12. The inside diameter at an end (i.e. right end as shown in FIG. 3) of the sleeve 3 is formed larger than the remaining inside diameter thereof so as to receive a collar bearing 32. The sleeve 3 is also provided with a hole 34 for injecting lubricating oil, and has a threaded end 35 for connecting with a nut 36.

The flywheel 4 is provided with a couple of bearings 42, 43 and a copper collar 44 within its shaft hole 41. When assembled, the bearings 42, 43 and the copper collar 44 are mounted about the sleeve 3.

The clutch 5 is placed around the end portion 14 of the crankshaft 1, and is provided with two slots 52 within its shaft hole 51 which are adapted to align with the two slots 15 in the end portion 14, wherebetween two keys 53 are respectively placed, so as to connect the crankshaft 1 and the clutch 5 together. The end portion 14 is then connected with a seal 54, and two nuts 55, 56. The driven side 58 of the clutch 5 is fixed with the flywheel 4 by bolts 57 and the driving side 59 is engaged with the crankshaft 1 by the two keys 53.

In use, when the driving side 59 is contacted with the driven side 58 driven by the flywheel 4, the driving side 59 then is rotated and causes rotation of the crankshaft 1 to be transferred. With this motion, the crankshaft 1 does not contact the flywheel 4 directly and is not directly driven by the flywheel 4. The crankshaft 1 is protected from damage caused by the friction or sudden impact. Moreover, because the driving load is transmitted by a larger contact area of clutch 5, it can prevent damage caused by an eccentric load. Accordingly, the present invention provides an improved crankshaft apparatus for crank machines.

As various changes can be made to the above invention without departing from the scope of the invention, it is to be understood that all matter herein described or shown in the accompanying drawings is to be interpreted as illustrative and not in a limiting sense. Thus it will be appreciated that the drawings are merely exemplary of a preferred embodiment of the invention.

We claim:

1. A crankshaft apparatus comprising:
    a crankshaft including a crank pin, an inner portion, a middle portion, and an end portion;
    a bearing mounted about said inner portion of said crankshaft;
    a sleeve mounted about said middle portion of said crankshaft and being adapted to be fixed to a crank machine frame by bolts, said sleeve having an inner hole substantially all of which has an inside diameter slightly larger than an outside diameter of said middle portion of said crankshaft, an end portion of said inner hole of said sleeve having an inside diameter larger than the remainder of said inner hole;
    a collar bearing mounted in said end portion of said inner hole of said sleeve;
    a flywheel mounted about said sleeve and having a shaft hole;
    bearings interposed between said flywheel and said sleeve;
    a collar mounted in said shaft hole of said flywheel and about said sleeve;
    a clutch mounted about said end portion of said crankshaft and including a driven side and a driving side, said driven side of said clutch being fixed to said flywheel;
    key means, operably connected between said end portion of said crankshaft and said driving side of said clutch, for causing engagement between said end portion of said crankshaft and said driving side of said clutch; and means for preventing said clutch, said flywheel, and said sleeve from falling off of said crankshaft.

2. A crankshaft apparatus as recited in claim 1, wherein said key means comprises at least one slot formed in said end portion of said crankshaft, at least one slot formed in said driving side of said clutch and opening toward said crankshaft, and at least one key mounted in said at least one slot formed in said end portion of said crankshaft and in said at least one slot formed in said driving side of said clutch.

3. A crankshaft apparatus as recited in claim 2, wherein said at least one slot formed in said crankshaft comprises two slots, said at least one slot formed in said driving side of said clutch comprises two slots, and said at least one key comprises two keys.

4. A crankshaft apparatus as recited in claim 3, wherein said end portion of said crankshaft has a threaded portion; and said preventing means comprises a seal mounted about said end portion of said crankshaft and two nuts threaded onto said threaded portion of said crankshaft.

5. A crankshaft apparatus as recited in claim 4, wherein said driven side of said clutch is fixed to said flywheel by bolts.

6. A crankshaft apparatus as recited in claim 5, wherein said collar comprises a copper collar.

7. A crankshaft apparatus as recited in claim 1, wherein said collar comprises a copper collar.

8. A crankshaft apparatus as recited in claim 2, wherein said collar comprises a copper collar.

* * * * *